United States Patent Office 3,520,209
Patented July 14, 1970

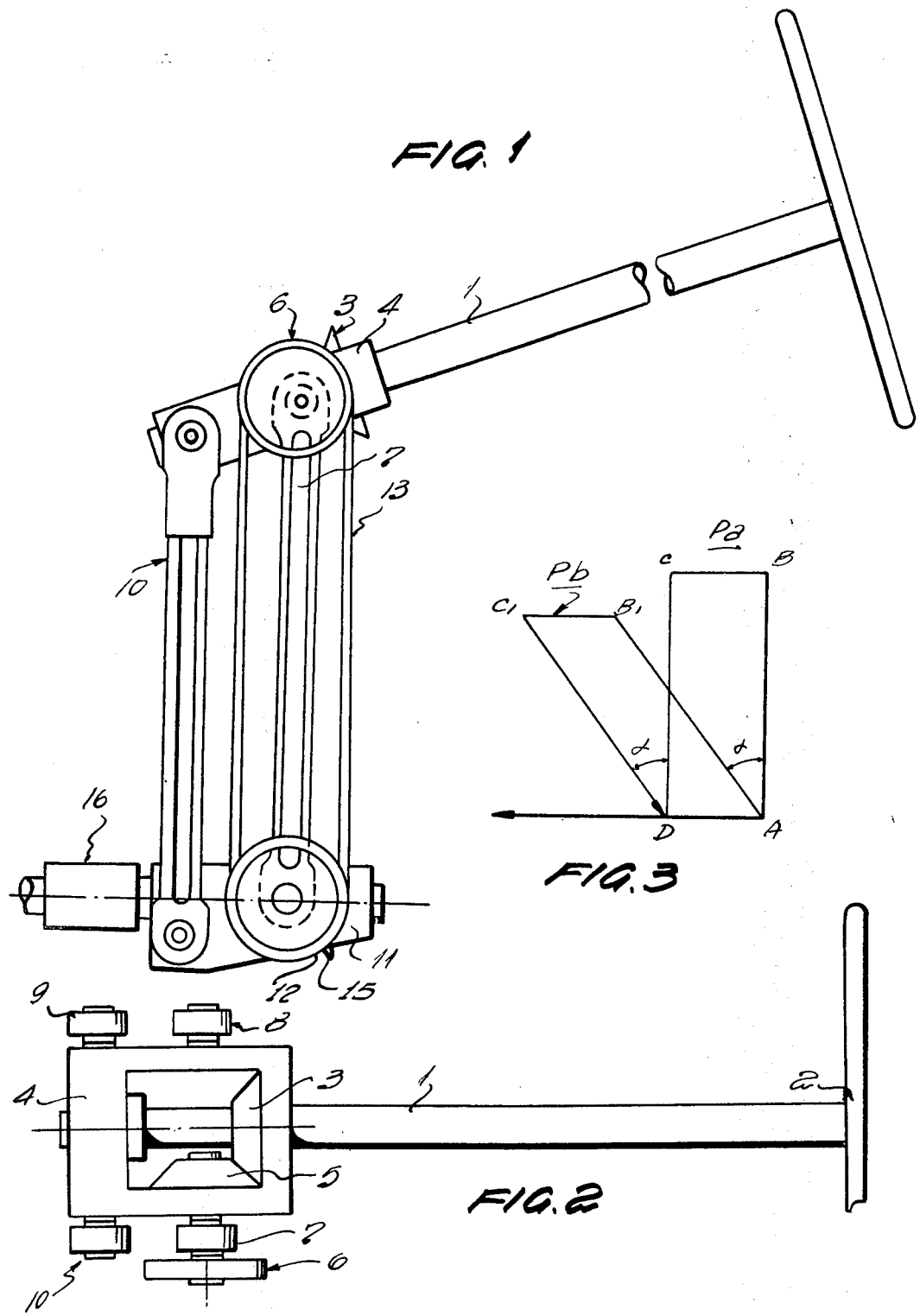

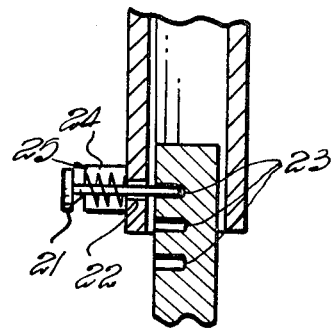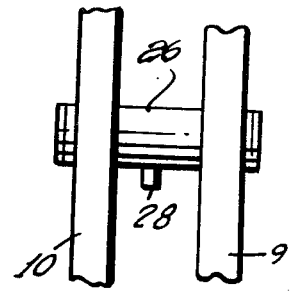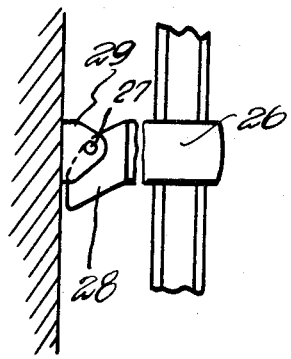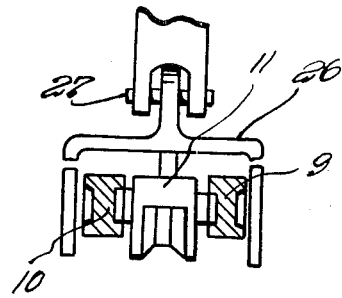

3,520,209
STEERING COLUMN FOR VEHICLES
Jorge Guatta Cescone, Ibera 5030,
Buenos Aires, Argentina
Filed May 29, 1968, Ser. No. 733,057
Claims priority, application Argentina, June 6, 1967,
207,778
Int. Cl. B62d 1/18
U.S. Cl. 74—493         12 Claims

ABSTRACT OF THE DISCLOSURE

A steering column is split into an upper part or column proper and a lower part or bar. Between these two parts is placed a mechanism comprising at least two connecting links pivoted to a first plate and to a second plate. The first plate is rotatively connected to the steering column and the second plate is connected to the bar. The plates and the connecting links form a deformable polygon that rotates around the longitudinal axis of the bar. The bar and the column are also connected by a mechanism for transmitting the rotative movement of the steering wheel to a shaft coupled to the steering gearbox of the vehicle.

---

This invention relates to improvements in steering columns used in steering mechanisms for vehicles.

In countless cases drivers have been seriously injured by the steering column upon a sudden stop or collision of the vehicle. This is particularly the case when the steering column is rigidly constructed.

This has promulgated many proposals for the construction of collapsible steering columns for the reduction or elimination of this hazard.

Some devices of this kind are comprised of steering columns that are divided in sections upon impact, thus destroying a basic component of the steering gear which may be repaired only through the replacement of several elements.

Other devices, which retract during the collision without destruction of fundamental elements of the assembly, are characterized in that they include columns made of telescopically associated sections which are retained in position of maximum elongation through expansion springs or by means of fasteners such as pins and keys, made of materials suitably adapted to provide a zone of weakness while normally assuring rigidity for the assembly and insuring ready fracture in case of an impact of a definite intensity.

Now, these systems have an acceptable functional efficiency when the impact is clearly frontal and coaxial with reference to the column. On the contrary, if, by circumstanital reasons, the direction of impact does not coincide with the steering column axis, the devices of this type, due to the friction between the telescoping parts dangerously reduces the retraction capacity of the assembly. The rigidity of the latter is thus proportionally increased tending to obstruct the qualities that were sought thus adding a complexity to the steering mechanism.

In accordance with the improvement of this invention, the steering column is a part of an assembly having the characteristic of instantaneous deformability under a proportionate external stimulus. Said column thus reaches positions of minimum erection so that the steering wheel may be flattened against the dashboard. Said assembly enables the formation of an object-free space in front of the driver, which is of great value in such critical moments as those of a collision, since, even when its rigidity is destroyed, those objects otherwise remain free in that space, thus constituting elements liable to produce injuries.

Further, the device of this invention features the additional advantage, on account of the particular arrangement of the mechanism, of enabling the lateral displacements of the steering wheel as desired by the driver.

This possibility means, at the present state of the art, the assembly of a special mechanism to secure this object. In the improvement of this invention it is a complementary function of the novel mechanism, which does not require additional elements involving or interferring in any way with the main capacity of defining an efficient steering mechanism which is additionally provided with the above noted safety features.

In the general case of automotive vehicles and in the particular case of passenger automobiles, said lateral displacement of the steering wheel, simultaneously with its steering column, means a markedly appreciated comfort feature, mainly for those drivers who, being corpulent and lacking agility, find that the steering wheel is an obstacle in their movements for entry and egress from the vehicle.

A third novel feature of the device of this invention is to provide, through the operator controlled variation of the distance between the elements forming the retracting mechanism for the steering column, for a change of the height of the steering wheel to allow for different physical characteristics and driving habits of the operator.

From a constructive viewpoint the novel features of this invention are characterized in that the steering column is divided into two sections, i.e. an upper section or steering column proper, which is fixed to the steering wheel and a lower section or bar ending at the steering gearbox. Between these two sections is located an intermediate assembly fundamentally comprising a deformable polygon linkage including two rigid connecting links one of which is telescopic and is provided with a device for adjusting its length. Both connecting links are pivotally mounted on two plates. The upper one of these plates pivotally supports the column on which a conical gear is mounted. An intermediate conical gear is pivotably supported on the upper plate and meshes with the gear on the column. The lower plate pivotally supports the bar and a conical gear is mounted on the bar. A second intermediate conical gear is rotatably mounted on the lower plate and meshes with the last named conical gear.

Both plates which are structurally linked through the above mentioned connecting links, are also mechanically connected through a mechanism transmitting rotative movement, the latter including a pair of gears mounted on the axis of rotation of the intermediate gears of both plates, said gears being linked by an endless chain.

The device is provided also with a locking mechanism for the moving parts that are to be locked. Thus, the freedom of movement of the deformable parallelogram, by variation of the angle between the connecting links and the plates, is limited by a shiftable mechanism enabling a reciprocal locking between one of the plates and one of the connecting links pivoting thereto. This device includes a small ball permanently pressed by a spring and partially protruding from a recess provided in the plate and received in one of a number of slots provided at the border of one end of said connecting link and facing the plate recess.

The distance between the ends of the controllable length connecting link is fixed, in the case of articulating sections, by means of a coupling enabling the operator's will, to lock the sections in accordance with variable angular positions. In the case of telescoping sections, said locking is secured by a locking mechanism connecting both sections and comprising a pin transverse to the connecting link longitudinal axis passing at the operator's will through a hole of the outer section into one of a series of recesses provided in the inner section.

The limiting and suppression of the rotation of the above described polygon linkage, not including around the bar is provided by a fork pivotally mounted on the vehicle body and receiving between its arms, in the locking position, at least one of the connecting links and having a locking member mounted on the body adapted to retain the fork in its operative unlocking position.

The above mentioned and other features and objects of this invention and the manner of attaining them, will become more apparent and the invention itself will be best understood by reference to the following description of an embodiment of the invention, referring particularly to a steering mechanism for an automotive vehicle, taken in conjunction with the accompanying drawings wherein:

FIG. 1 is a side view of a steering mechanism employing the device of the invention;

FIG. 2 is a plan view of the mechanism;

FIG. 3 is a diagrammatic view of two positions of the polygon linkage of the device;

FIG. 7 shows a section of the locking mechanism used to fix the distance between the ends of the telescoping connecting link; and FIGS. 8, 9 and 10 are front, side, and plan views, respectively, of the fork for restricting the rotating movement of the device around the axis of rotation of the bar.

In all the figures, the same reference numerals refer to the same or equivalent parts of the device.

Figure 5:
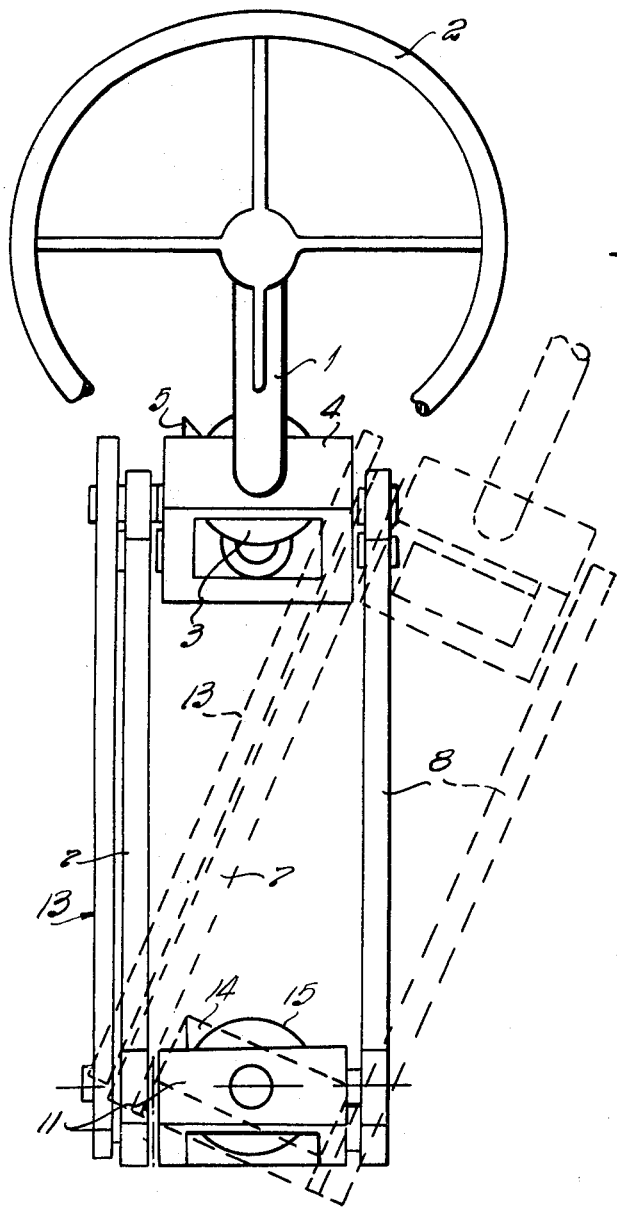
FIG. 5 is a front view of this device in which there is shown in dotted lines a position of lateral displacement of the steering wheel by rotation of the device around the axis of the bar.

With reference more particularly to FIGS. 1, 2 and 5, therein is shown a side view, a plan view and a front view, respectively, of the device that is placed between the two split sections 1 and 16 of the steering column. Column 1 supports, at one end, the steering wheel 2, and at the other end it is provided with a conical gear 3. Column 1 is rotatably connected to a rigid plate 4 through a hole containing an associated bearing.

The rigid plate 4 serves as a support for an intermediate conical gear 5 meshing with the gear 3, the shaft of the former passing through said plate. On the shaft of this intermediate conical gear 5 is also mounted a gear 6, and a connecting link 7 which is freely pivoted by means of a bearing.

Also mounted on the plate 4 through associated bearings are the extremities of pivotal connecting links 8, 9, and 10, the last two being telescopic.

On a lower plate 11, similar to upper plate 4, are freely pivoted, by means of associated bearings, the lower ends of connecting links 7, 8, 9, and 10. On the rotating axis of the lower end of connecting link 7 is mounted a gear 12. A chain 13 meshes with gears 6 and 12. On the shaft of gear 12 is firmly attached an intermediate conical gear 14 which in turn meshes with conical gear 15 which is connected to bar 16 the other end of which reaches the steering gearbox.

Figure 6:
FIG. 6 is a view of the shiftable mechanism at the rotatable connection between a link and a plate.

One of the connecting links, at its point of connection with one of the plates, is provided with a shiftable locking device, formed, as shown at FIG. 6, by a small ball 17 acted on by spring 18, received in the recess 19 of a plate, and a series of slots 20 provided at the end of the associated connecting link.

Links 9 and 10, as above said, are telescopic and each is provided with a device for locking the distance between their ends. This device comprises, as shown in FIG. 7, a transverse pin 21, passing through a hole 22 of the outer section and being received in one of a number of recesses 23 in the inner section. This pin is permanently biased towards its housing by means of spring 24 the ends of which bear respectively against the cup 25 containing the spring and the external surface of the outer section of the telescoping connecting link.

The two links 9 and 10 are placed within a fork 26, as shown in FIG. 8. The fork 26 is rotatably linked to the vehicle body by means of a pin 27 passing through a hole provided in legs 28 of the fork. The pin 27 is fixed at its ends to the arms of a bracket 29 mounted on the car body.

The operation of this device is as follows:

During the normal driving of the car, the rotating movement applied by the operator to the column 1 by acting upon the steering wheel 2, is received by the conical gear 3, located at the plate 4 which, in meshing with the intermediate conical gear 5, transmits its rotating movement to the shaft of the same, on which is fixed the gear 6, which meshes with the endless chain 13 and so transfers the movement to the assembly of plate 11, where it is received by the gear 6 fixed to the shaft of the intermediate conical gear 14 meshing in turn with the conical gear 15 fixed to the bar 16 having its extremity at the steering gearbox.

In this case, the intermediate mechanism has merely operated as a transmitter of the rotative movement that was started at the steering wheel 2.

The first feature of the mechanism of the invention is demonstrated when a front impact force acts upon the column 1. This force overrides the pressure of spring 18 located within the recess 19 of one of the plates, so that the ball 17 shifts away from its housing into the slot 20. Thus, the system formed by the connecting links, the upper plate 4 and the column 1 is free to rotate around the articulation of the connecting links with the lower plate. This rotation will take place in a vertical plane defined by the arms of fork 26 up to a position in which the steering wheel contacts the dashboard. This is the position of minimum erection.

The second feature of the device of this invention is apparent when the operator voluntarily unlocks the fork 26 so that it can be rotated upwards around the pin 27. In this position, the system that has been defined in the above paragraph, complemented by the plate 11 assembly and the intermediate conical gear 14, is adapted to rotate around the axis of bar 16. It can thus be shifted sidewise away from the driving position by an amount as desired by the operator or until it is stopped by a mechanical limiting device fixed to the system, as shown, in the phantom view of FIG. 5.

The third feature of the device of this invention is shown when the operator voluntarily unlocks pin 21 taking it out from its housing 23 against the bias of spring 24. By acting upon column 1 in a vertical plane the operator is able to set the height, in that plane, at which he wishes to locate the steering wheel 2. To this effect, pin 21 is left free and then it is engaged in another recess of the connecting link inner section, in accordance with the distance between the connecting link ends that has been specified by the operator.

Figure 4:
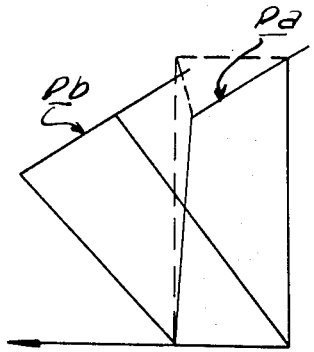
FIG. 4 is a diagrammatic view, in two positions, of the polygon linkage wherein the distance between the ends of one of the connecting links has been changed from that in the preceding figure.

FIGS. 3 and 4 are diagrammatic illustrations of the different appearances of the deformable polygon for various distances between the ends of the telescoping connecting link.

FIG. 3 shows, for the case in which the length of the telescoping connecting link CD has been made equal to the length of the fixed connecting link AB, the positions $Pa$ and $Pb$ that can be taken by the device when tilting forward. The line of column $C_1B_1$ remains parallel during the movement to line CB representing the driving position.

FIG. 4 shows, for the case in which the length of the telescoping connecting link CD has been made equal to a value $C'D$, the positions of the deformable polygon and particularly columns CB according to line $C'B$ which is angularly raised in relation to the former. $Pb$ shows the shape of the deformable polygon when the device is tilted forward in this case.

While the principles of the invention have been described above in connection with specific apparatus and applications, it is to be understood that this description is made only by way of example and not as a limitation on the scope of the invention.

I claim:

1. A steering column for a vehicle comprising first and second portions with respective axes spaced from one another, a steering wheel on the first portion, the second portion being adapted for engagement with a steering gearbox mechanism, and means connecting said portions and defining a deformable polygon linkage enabling collapse of said column about the axes of said second portion upon application to said column of a force of a predetermined magnitude, said means comprising a first rigid plate rotatably supporting said first portion, a second rigid plate rotatably supporting said second portion, connecting links having opposite ends respectively connected to said first and second plates and defining therewith said deformable polygon linkage, and means for transmitting rotative movement from said first portion to said second portion.

2. A column as claimed in claim 1, wherein said connecting links are supported from said plates so as to be angularly movable in planes which are mutually parallel and also parallel to a plane containing the first and second portions.

3. A column as claimed in claim 1, wherein at least one of said connecting links comprises means for adjusting the length of such link.

4. A column as claimed in claim 3, wherein the link of adjustable length comprises two telescoping sections and said means for adjusting the length comprises a locking mechanism for setting the sections in a prearranged position.

5. A column as claimed in claim 4, wherein said locking mechanism comprises a pin extending transverse to the longitudinal axis of the associated connecting link, said link having an outer and an inner section, said pin being received in a hole passing through the outer section of said link and adapted to be introduced into one of a number of recesses provided in the inner section of said link.

6. A column as claimed in claim 1, wherein said means for transmitting rotative movement comprises a driving conical gear fixed to said first portion, an intermediate conical gear rotatably mounted on said first plate and meshing with said driving gear; a second intermediate conical gear rotatably mounted on said second plate, means connecting said intermediate conical gears in driving relation and a driven conical gear fixed to said second portion and in mesh with said second intermediate conical gear.

7. A column as claimed in claim 6, wherein said means connecting said intermediate conical gears comprises gears respectively coupled to said intermediate conical gears and a chain meshing with said gears which are coupled to said intermediate conical gears.

8. A column as claimed in claim 1 comprising means between at least one of said connecting links and the plate to which it is connected for temporarily locking the connecting link in relation to the plate with a force related to said predetermined magnitude to yield upon application thereof and permit collapse of said column.

9. A column as claimed in claim 8, wherein the locking means comprises a small ball, a spring acting on said ball and engaged in a recess provided in said plate, said connecting link having a number of slots facing the recess in the plate for receiving the ball under the pressure of said spring.

10. A column as claimed in claim 1 comprising a rotatable fork having spaced arms separated by a distance to guidably receive and prevent transverse angular movement of the linkage while insuring collapse thereof about the axis of said second portion.

11. A column as claimed in claim 1 comprising means for engaging said linkage to prevent transverse angular movement thereof while insuring collapse thereof about the axis of said second portion, the latter means being releasable to an inoperative position in which the linkage is transversely pivotable about the axis passing through said second portion.

12. A column as claimed in claim 11 comprising means between at least one of said connecting links and the plate to which it is connected for temporarily locking the connecting link in relation to the plate with a force related to said predetermined magnitude to yield upon application thereof and permit collapse of said column.

References Cited

UNITED STATES PATENTS

| | | | |
|---|---|---|---|
| 3,078,946 | 2/1963 | Young | 74—493 X |
| 3,412,629 | 11/1968 | Hill | 74—493 |
| 3,429,196 | 2/1969 | White | 74—493 |

MILTON KAUFMAN, Primary Examiner

U.S. Cl. X.R.

180—78; 280—87